United States Patent
Davies et al.

(10) Patent No.: US 11,034,515 B2
(45) Date of Patent: Jun. 15, 2021

(54) DISPOSABLE CONTAINER WITH HANDLE

(71) Applicant: Dynalab Corp., Rochester, NY (US)

(72) Inventors: Martin Davies, Victor, NY (US); John Potter, Churchville, NY (US); Christine Leskovar, Livonia, NY (US)

(73) Assignee: Dynalab Corp., Rochester, NY (US)

( * ) Notice: Subject to any disclaimer, the term of this patent is extended or adjusted under 35 U.S.C. 154(b) by 0 days.

(21) Appl. No.: 16/354,404

(22) Filed: Mar. 15, 2019

(65) Prior Publication Data
US 2020/0290800 A1 Sep. 17, 2020

(51) Int. Cl.
*B65F 1/14* (2006.01)
*B65F 1/06* (2006.01)
*B65F 1/16* (2006.01)

(52) U.S. Cl.
CPC .............. *B65F 1/1452* (2013.01); *B65F 1/06* (2013.01); *B65F 1/1607* (2013.01); *B65F 2220/102* (2013.01); *B65F 2250/108* (2013.01)

(58) Field of Classification Search
CPC .... B65F 1/16–165; B65F 1/1452; B65F 1/06; B65F 1/1607; B65F 2220/102; B65F 2250/105; B65F 2250/108; B65F 2250/114–116; B65D 5/68–685; B65D 5/727; B65D 5/46072; B65D 5/46088; B65D 5/46192
USPC ............ 229/125.32, 117.16, 120.01, 125.01, 229/125.19, 125.31, 220, 125.12, 129.1; 220/254.3, 254.5, 825
See application file for complete search history.

(56) References Cited

U.S. PATENT DOCUMENTS

| | | |
|---|---|---|
| 2,379,665 A | 7/1945 | Stone |
| 2,583,211 A | 1/1952 | Fleming |
| 2,971,688 A | 2/1961 | Akers |

(Continued)

FOREIGN PATENT DOCUMENTS

| | | | |
|---|---|---|---|
| EP | 0333147 A1 | 9/1989 | |
| EP | 0477058 A1 * | 3/1992 | ............... B65D 5/68 |

(Continued)

OTHER PUBLICATIONS

Machine Translation EP 0477058 A1 (Year: 1992).*

(Continued)

*Primary Examiner* — Nathan J Newhouse
*Assistant Examiner* — Phillip Schmidt
(74) *Attorney, Agent, or Firm* — Heslin Rothenberg Farley & Mesiti P.C.; Kristian E. Ziegler, Esq.

(57) ABSTRACT

A portable container for waste products, having an assembled receptacle with four side panels hingedly connected, the four side panels connected to a plurality of bottom closure panels forming a bottom closure, with the four side panels and the bottom closure define a box with a top opening. The four side panels include a first and a second set of opposing side panels, the first set of opposing side panels having a first side panel and a second side panel. A first side panel has a first handle, the first handle having a first handle first position and a first handle second position. A second side panel has a second handle, having a second handle first position and a second handle second position. The first handle and the second handle are opposably, pivotally, movable relative to each other.

21 Claims, 8 Drawing Sheets

(56) References Cited

U.S. PATENT DOCUMENTS

| | | | |
|---|---|---|---|
| 4,548,351 A * | 10/1985 | Gusic | B65D 5/70 206/586 |
| 4,576,329 A * | 3/1986 | Wright | B65D 5/46024 190/107 |
| 4,863,052 A * | 9/1989 | Lambert | B65D 5/46088 229/117.3 |
| 4,869,366 A | 9/1989 | Bruno | |
| 4,976,355 A * | 12/1990 | Crutchfield | B65F 1/00 206/457 |
| 5,060,850 A | 10/1991 | Weaver | |
| 5,096,114 A | 3/1992 | Higginbotham | |
| 5,105,969 A | 4/1992 | Lamas | |
| D327,555 S | 6/1992 | Juergens | |
| D328,375 S | 7/1992 | Levine | |
| 5,240,176 A | 8/1993 | Akers | |
| 5,257,734 A * | 11/1993 | Bartle | A47G 29/06 229/109 |
| D355,514 S | 2/1995 | Breen | |
| D362,525 S | 9/1995 | Kruger | |
| D376,456 S | 12/1996 | Presnell et al. | |
| 6,209,781 B1 | 4/2001 | Sylvester et al. | |
| 7,694,811 B2 | 4/2010 | Brown et al. | |
| 8,550,246 B2 | 10/2013 | Hofgartner | |
| D717,160 S | 11/2014 | Kurniawan et al. | |
| 10,077,130 B1 | 9/2018 | Fron et al. | |
| D837,062 S | 1/2019 | Senior | |
| D855,454 S | 8/2019 | Sanfilippo et al. | |
| 2006/0091190 A1 | 5/2006 | Nikolai | |
| 2006/0102705 A1 * | 5/2006 | Anderson | B65D 5/60 229/117.35 |
| 2015/0307227 A1 * | 10/2015 | Yamamura | B65D 5/42 229/117.16 |

FOREIGN PATENT DOCUMENTS

| | | |
|---|---|---|
| JP | 2008051607 A | 8/2006 |
| KR | 101666487 B1 | 10/2016 |

OTHER PUBLICATIONS

Allpack Sri, Containers for hazardous medical wastes in cardboard, Via Lenin 37/B | 46029 Suzzara (MN)—Italy, downloaded from website http://www.allpack.it/en/containers-for-hazardous-medical-wastes-cardboard/ on Nov. 6, 2018.

Ace innovations, Ten Second Litter Boxes (10 Litter Boxes—10 Week Supply), Amazon.com, downloaded on website https://www.amazon.com/Second-Litter-Boxes-Boxes-Supply/dp/B0143J7G5U/ref=as_at?creat.. on Nov. 6, 2018.

Glass Disposal Box available from www.dynalon.com, printed from the Internet on Jun. 5, 2019, (Wayback Verification Crawl presence date Jun. 17, 2015 https://web.archive.org/web/20150617064905/http://www.dynalon.com/), at least as early as Jun. 17, 2015.

* cited by examiner

DISPOSABLE CONTAINER WITH HANDLE

BACKGROUND OF THE INVENTION

Technical Field

The present invention generally relates to the field of waste disposal containers or boxes. More particularly, the present invention relates to containers or boxes for disposal of glass, sharp materials or non-hazardous plastic recyclable waste generated in laboratories, offices, hospitals and at other locations, and for transport of the waste to a disposal site.

Background Information

Paperboard and paper-based disposal containers and boxes have been in the market for many years and are commonly used to store and transport glass, plastic, and sharp waste material. Paperboard boxes continue to be used because they are sturdy enough to resist punctures from most glass, plastic, or sharp waster material.

The problem with using paperboard boxes arises when transporting or moving the boxes. Since the waste material includes glass, plastics, or sharp materials, it is possible for the waste material to poke through the paperboard. Grasping a paperboard box by its base or by its sides puts a person's hands, arms, the torso area, and other body areas in close proximity to the waste materials. Grasping the box by the sides may place pressure on the side panels, causing the box to bow or bend. If the box breaks or ruptures this may lead to injury. For safety purposes, lifting may also require special protectives gloves or clothing just to move a box. Furthermore, repetitive bending by people carrying such boxes can lead to knee, hip, and back issues by workers.

There are problems with currently existing handles on existing waste disposal boxes. Some handles may be of a type that pivots from the plane of the box surface, however these all tend to pivot out from the top surface or lid of the box. Other handles may of the type that is a fixed handle, sticking out from an assembled box or lid of the box. Still other handles may be of a plastic or other non-paper based material, with these types of handles tending to go through the box surface and to stick out from the assembled box.

The handles that pivot out from the top surface or lid of the box pose multiple problems. Often, handles that pivot outwards from the box leaving a hole in the lid. This structure places a person's hand in close proximity with the waste material. Handles that pivot from the box top surface without making a hole may only use a portion of the paperboard material, but tend to be susceptible to tearing or ripping, making this structure suitable only for lifting small boxes. It is also common for such boxes to have a single handle. Small boxes are not very practical in a laboratory environment, particularly in busy locations.

While fixed handles tend to be sturdier than pivot handles, many box makers make single-handle boxes. This limits the size of the box and limits the amount of waste material because these are boxes intended for one-handed carrying.

Whether fixed or pivoting, handles located on the box lid or on top of the box pose another problem. Such handles require boxes that have non-removable lids or have some fastening means that prevents the top from being easily removable and allow the box to be lifted. These box lids also tend to have fixed disposal openings, limiting the size of the waste material that can be put into the box. Handles positioned on the box lid also have a tendency to obstruct the disposal opening.

Fixed handles tend to stick out from the box making transportation and stacking difficult. Handles that stick out from the top make it difficult to vertically stack the boxes. Handles that stick out to the sides make horizontal stacking difficult. Fixed handles also involve more complicated box assembly by the user or extra shipping costs for already assembled boxes.

Handles that are made from materials other than paper-based container materials need to be assembled or installed separately, largely complicate vertical and horizontal stacking, and add to the cost of production. Final disposal may also be complicated because the handles may need to be removed for separate disposal, making disposal more expensive.

Thus, a need exists for a box with pivoting handles, that is sturdy, that protects the carrier, that can be easily packed and stacked for moving and transportation, that can accommodate larger objects, and yet is fully disposable, while minimizing cost.

SUMMARY OF THE INVENTION

A portable container for waste products, having an assembled receptacle with four side panels, hingedly connected, having bottom edges, hingedly connected, to a plurality of bottom closure panels, the bottom closure panels overlapping to form a bottom closure. The four side panels each have a top edge, such that the four side panels and the bottom closure define a box with a top opening. The four side panels include a first and a second set of opposing side panels, the first set of opposing side panels having a first side panel and a second side panel. The first side panel has a first handle, the first handle having a first handle first position and a first handle second position, such that the first handle first position is coplanar with the first side panel. The first handle further has a first handle top, a first finger hold, and a first handle bottom, the first handle bottom being parallel to a first panel bottom edge and pivotally secured to the first side panel, with the first handle being pivotally movable in an arc extending from the first side panel about the first handle bottom to a first handle second position, angled away relative to the first side panel, and defining a first gap coplanar with the first side panel. The second side panel has a second handle, having a second handle first position and a second handle second position, such that the second handle first position is coplanar with the second side panel. The second handle further has a second handle top, a second finger hold, and a second handle bottom, the second handle bottom being parallel to a second panel bottom edge and pivotally secured to the second side panel, with the second handle being pivotally movable in an arc extending from the second side panel about the second handle bottom to a second handle second position, angled away relative to the second side panel, and defining a second gap coplanar with the second side panel. The first handle and the second handle are opposably movable relative to each other. Further included is a removable top closure having a lid panel and four closure panels configured substantially perpendicular to the lid panel to define a box lid, wherein the lid panel has a top side and a bottom side.

A method for safely disposing waste products, including providing a receptacle having a bottom closure, and four side panels, defining a box with a top opening, where the four side panels include a first and a second set of opposing side panels, the first set of opposing side panels having a first side panel and a second side panel. The first side panel includes a first handle, the first handle having a first handle first position and a first handle second position, such that the first handle first position is coplanar with the first side panel. The first handle further has a first handle top, a first finger hold, and a first handle bottom, the first handle bottom being parallel to a first panel bottom edge and pivotally secured to the first side panel, with the first handle being pivotally movable in an arc extending from the first side panel about the first handle bottom to a first handle second position, angled away relative to the first side panel, and defining a first gap coplanar with the first side panel. The second side panel includes a second handle, the second handle having a second handle first position and a second handle second position, such that the second handle first position is coplanar with the second side panel. The second handle further has a second handle top, a second finger hold, and a second handle bottom, the second handle bottom being parallel to a first panel bottom edge and pivotally secured to the second side panel, with the second handle being pivotally movable in an arc extending from the second side panel about the second handle bottom to a second handle second position, angled away relative to the second side panel, and defining a second gap coplanar with the second side panel. The first handle and the second handle are opposably movable relative to each other. The receptacle contains waste products. The first handle is placed in first handle second position and the second handle is placed into second handle second position. A removable top closure having a top side and a bottom side, a lid panel, and four closure panels defining a box lid, the four closure panels being substantially perpendicular to the lid panel, is placed on the receptacle. The step of placing the removable top closure on the receptacle includes the four closure panels overlapping the four side panels, such that a first closure panel is operatively configured between the first finger hold and the first gap and a second closure panel is operatively configured between the second finger hold and the second gap of the receptacle. The receptacle and top closure form a portable container.

DETAILED DESCRIPTION OF THE INVENTION

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Thus, all the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations. Moreover, in the present description, the terms "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
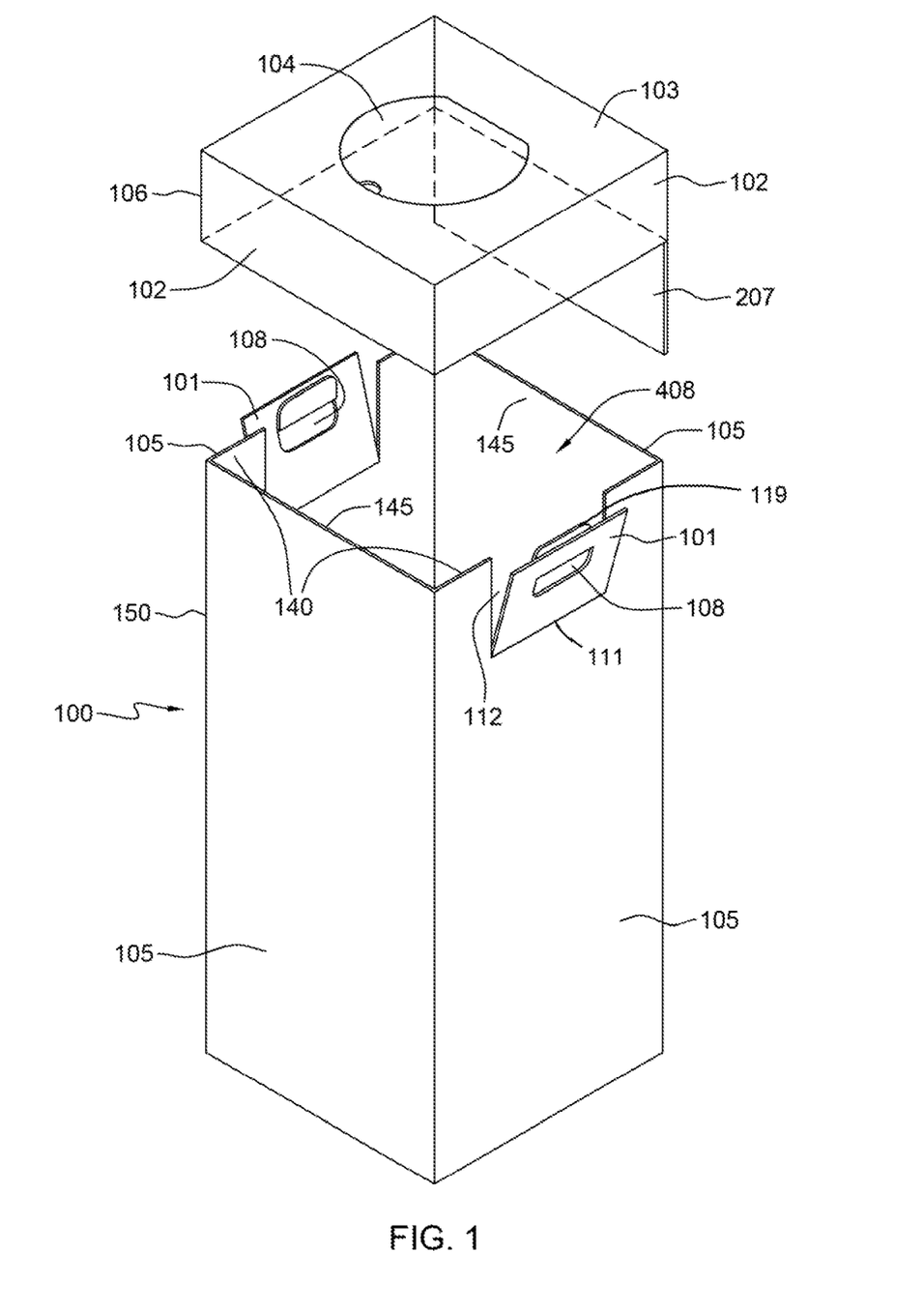
FIG. 1 is a disassembled top front perspective view of an embodiment of a portable container having a receptacle and a removable top closure.

FIG. 1 depicts a top front perspective view of an embodiment of a portable container 100 for waste products with a removed top closure 106. The term portable container may also be referred to as a box or a similar container. Shown in this figure are a receptacle 150 and a removable top closure 106. The receptacle 150 is depicted having side panels 105, of which there may be a plurality. Four side panels 105 are depicted in this embodiment. Each side panel may have, a top, a bottom, two side edges, an inner surface, and an outer surface. The tops of connected side panels 105 define a receptacle opening 408, leading to the interior of receptacle 150. Of the four side panels is a first set of opposing side panels 140 and a second set of opposing side panels 145. The removable top closure 106 has a lid panel 103, a pivotally connected flap 104 covering a disposal opening 114 (see FIG. 2), and closure panels 102. There may be a plurality of closure panels 102, but in this embodiment two of a total of four closure panels 102 are shown.

Referring to FIG. 1, a handle 101 is shown on each of the first set of opposing side panels 140. Handle 101 may have a top, a bottom, two sides, an inner surface and an outer surface. There may be a plurality of handles 101, with, for example, one handle 101 per side panel of portable closure 100. Handle 101 is shown having finger holds 108 and finger hold flaps 119. Handles 101 are depicted in a second position, pivoted out from the plane of the outer surface of one of side panels 105, resulting in gaps 112. Handle 101 pivots at a handle connection 111 to side panel 105, where handle connection 111 may also be the bottom of handle 101. A first handle position also exists, with first position having each of handles 101 coplanar with the side panel 105 to which handle 101 is pivotally connected (see FIG. 6).

Also depicted in FIG. 1, is a single pivotally connected protective panel 207. Protective panel 207 is most likely to be connected to a single closure panel of closure panels 102.

Protective panel 207 is shown located at the rear of top closure 106. However, in other embodiments, the protective panel 207 or panels may also be at the front, the back, or one or both sides of the top closure 106, or combinations thereof.

Figure 2:
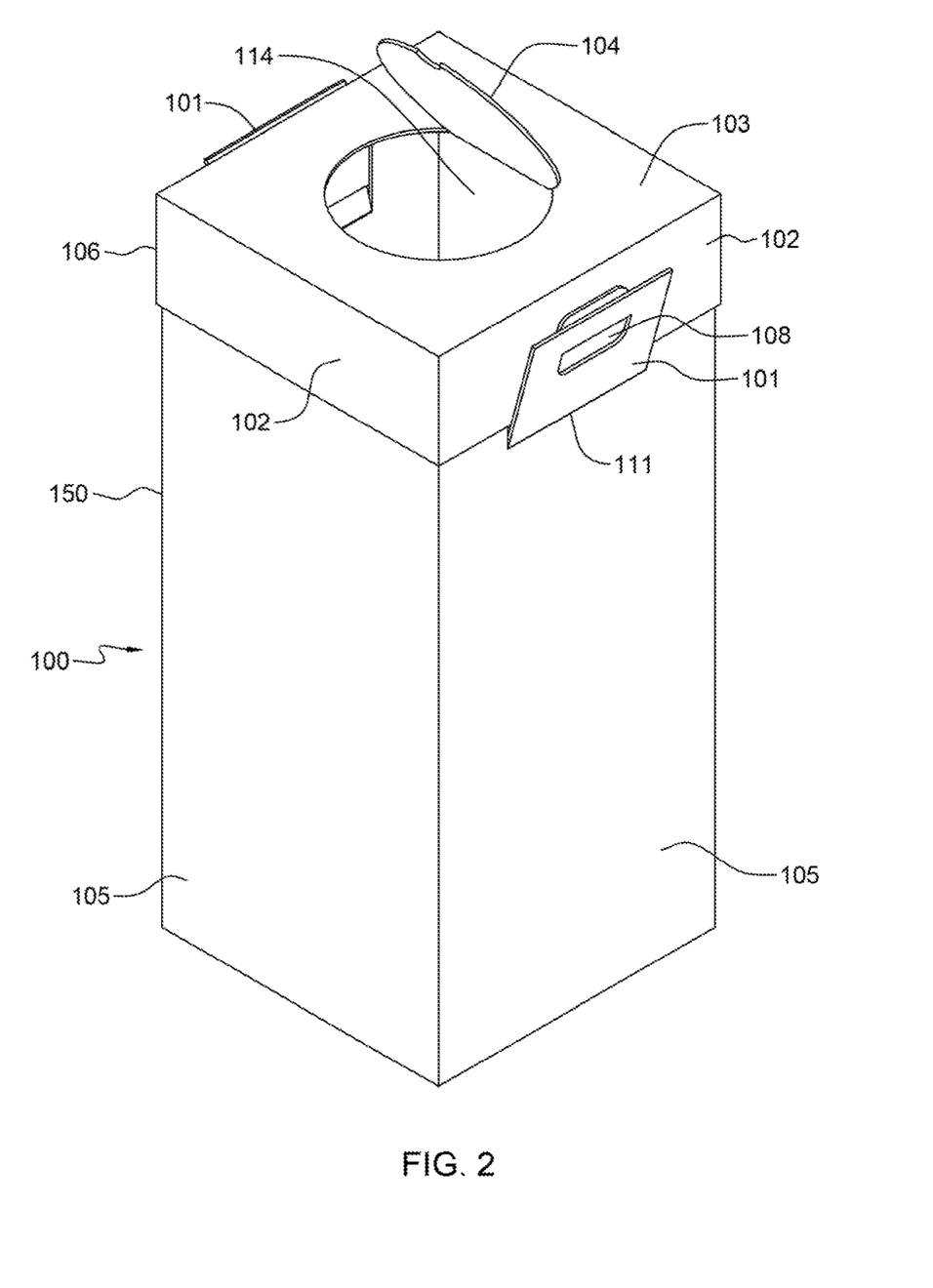
FIG. 2 depicts a top front perspective view of the portable container of FIG. 1, with a removed top closure engaged.

FIG. 2 depicts an embodiment of portable container 100 for waste products with removable top closure 106 covering receptacle 150 and opening 408 (see FIG. 1). Removable top closure 106 may have lid panel 103 and closure panels 102. The flap 104 is in an open position and disposal opening 114 is visible. Handles 101, with finger hold 108, are depicted as pivoted out from the plane of side panels 105.

Figure 3:
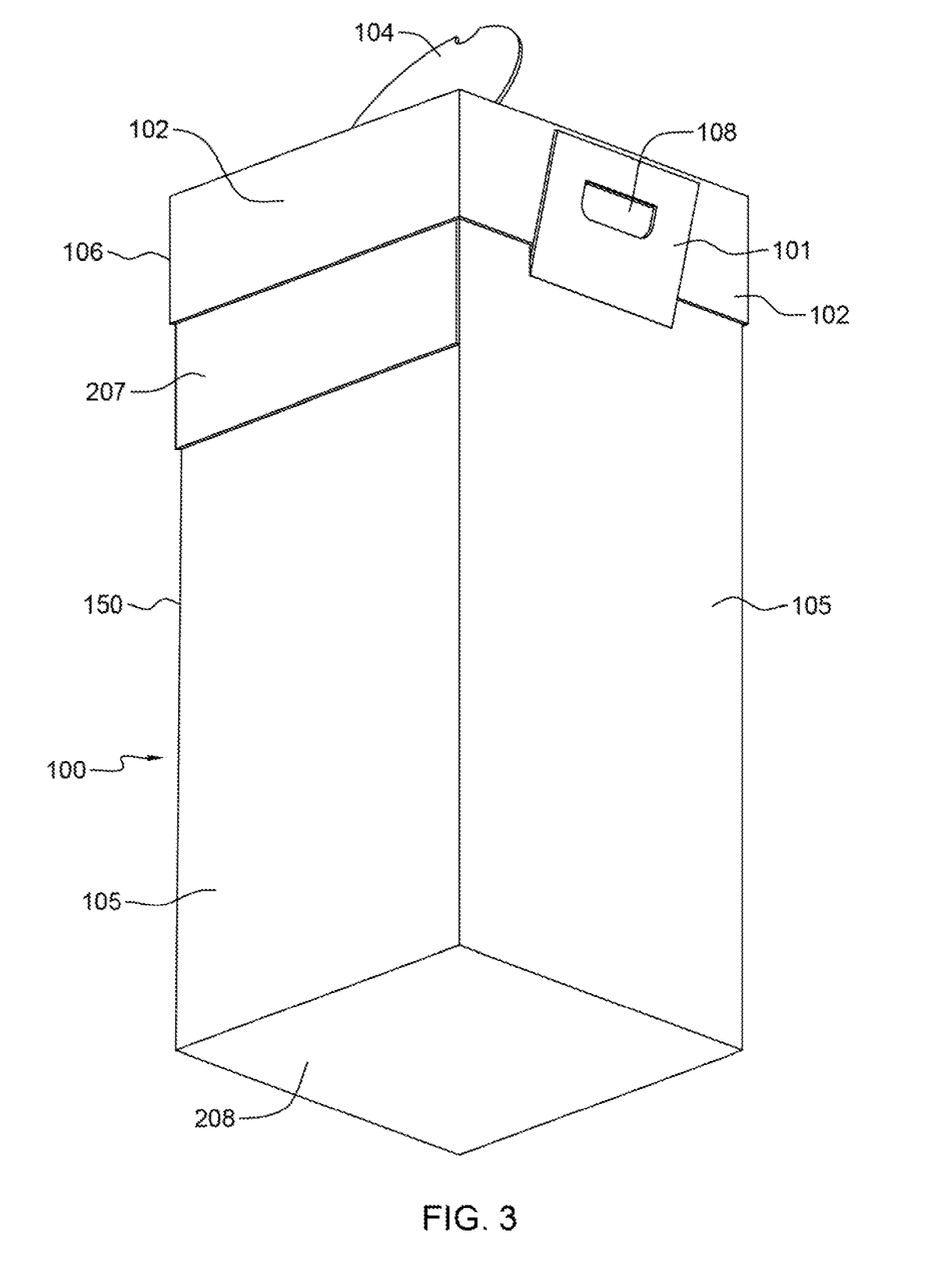
FIG. 3 depicts a bottom rear perspective view of the portable container of FIG. 1 with handles in a second handle position.

FIG. 3 depicts a bottom rear perspective view of an embodiment of portable container 100. Also depicted is fastened or engaged top closure 106 having closure panels 102, and flap 104 visible in an open position. Protective panel 207 is shown extending downward from lid panel 103.

Still referring to FIG. 3, receptacle 150 also has a bottom closure 208, which is generally perpendicular to side panels 105 at the side panel bottom edges. Bottom closure 208 is depicted in this embodiment as being solid. However, bottom closure 208 may be of any box bottom closure type including, for example, a slotted container bottom, a snap-lock bottom, a 1-2-3 bottom, an autolock bottom, a tuck and tongue bottom, a six corner tray style bottom, a beer style bottom, or a sealed end style bottom. Other box styles which may be used include, for example, a slotted box with scores, a bellow style top and bottom, a telescope box, a design style, a roll end tray, and a folder style.

Figure 4:
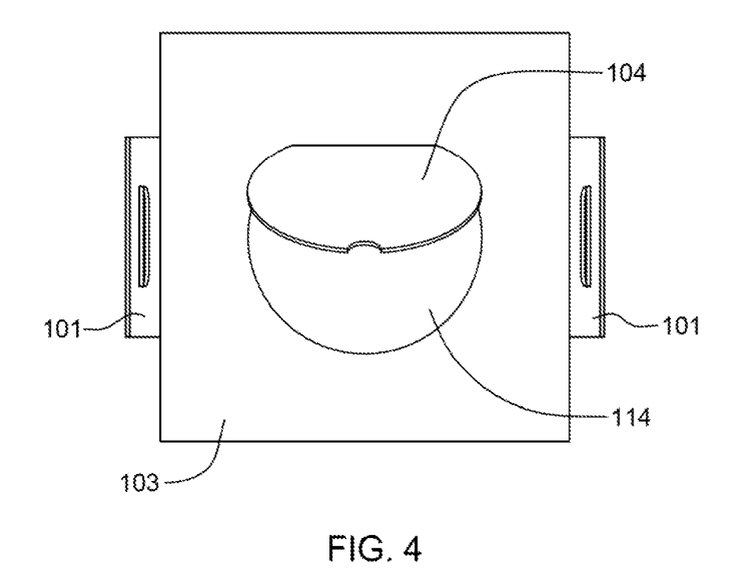
FIG. 4 depicts a top view of the portable container of FIG. 1 with top closure engaged.

FIG. 4 depicts a top view of an embodiment of a portable container 100 for waste products. Handles 101 are shown in second position with the removable top closure 106 affixed to the top of the receptacle (not visible). Also depicted are pivotally connected flap 104, in an open position, and disposal opening 114.

Figure 5:
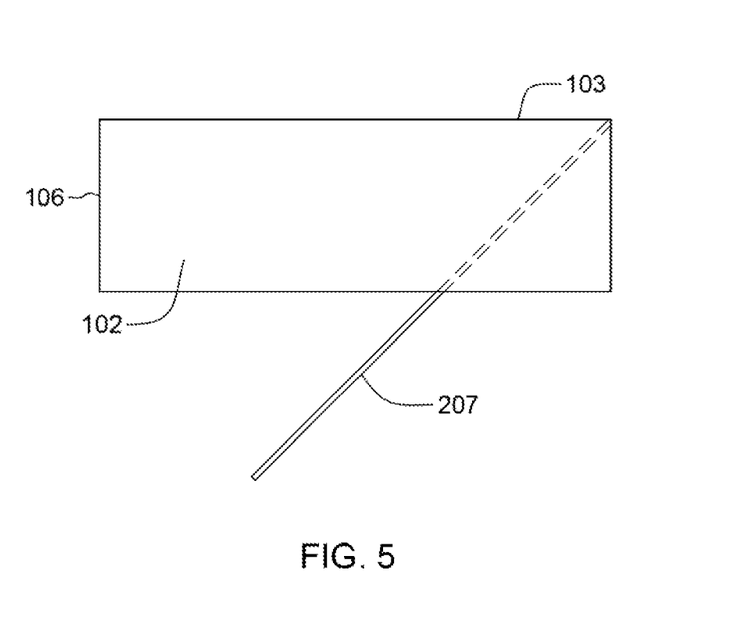
FIG. 5 depicts a side view of the removable top closure from FIG. 1.

Referring to FIGS. 4 and 5, protective panel 207 may be seen extending from the interior of top closure 106. Protective panel 207 may extend down from one of the closure panels 102, fold over, and extend towards the underside of lid panel 103. Protective panel 207 extends from the end of one of the closure panels 102, where it is pivotally connected and placed against the underside of lid panel 103 to cover disposal opening 114.

Figure 6:
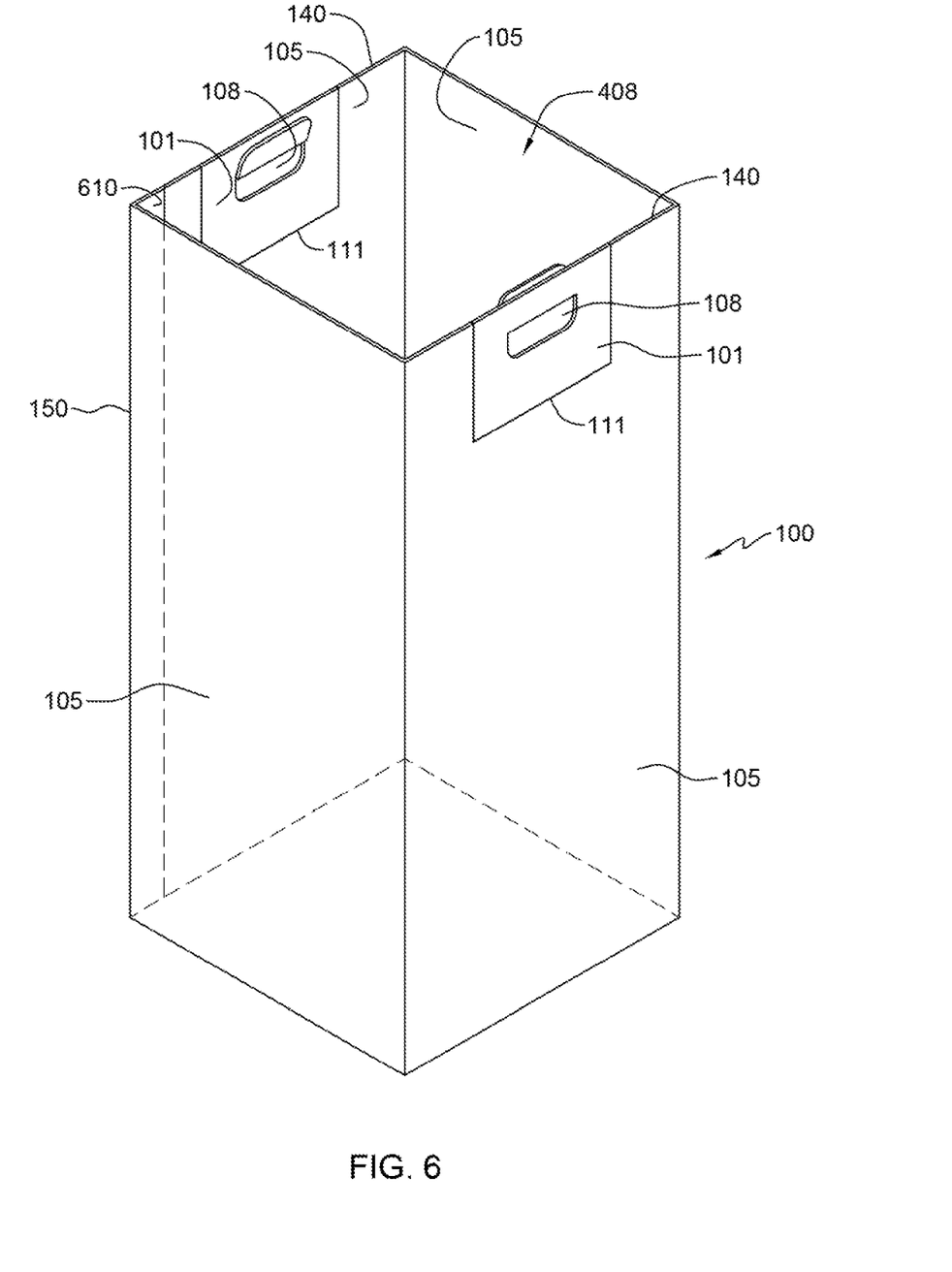
FIG. 6 depicts a top perspective view of the open receptacle from FIG. 1. with handles in first position.

FIG. 6 depicts a perspective view of an embodiment of an open receptacle 150 with the handles 101 shown in first position. Side panels 105 and handle connections 111 are shown. Handles 101 are positioned on the first set of opposing side panels 140. Depicted is a side panel overlap 610 which is hingedly connected to one of panels 105. For assembly, receptacle 150 may have, side panel overlap 610 folded and connected to the interior face of an adjacent side panel. For example, for receptacle 150 with four side panels, panel overlap 610 may be foldably connected to a first side panel and affixed to the interior face of a fourth side panel, such that each side panel 105 may be perpendicular to each adjacent side panel 105. In this embodiment, a single wall corrugated board fastener or adhesive is used, but any suitable paper-based container material fastener or adhesive may be used for the connection.

Referring to FIGS. 1-6, receptacle 150 is depicted as a box with an open top. The tops of panels 105 define the open top of receptacle 150 and panels 105 define the boundaries of opening 408. Portable container 100, receptacle 150, removable top closure 106, and handles 101 may be made of single wall corrugated board. It is most common that all components of portable container 100 are from paper-based container material such as single wall corrugated board. However, other paper-based container materials including, for example, paperboard, boxboard, containerboard, other corrugated board, corrugated fiberboard, and solid fiberboard, may be used. Other non-paper materials may be used, with disposability being a desirable material characteristic.

Plastic corrugated board or other foam core type board materials may be used. However, paper-based container materials are desirable due to the low cost and the ease of container disposal. It may be possible to have a top closure 106 of one type of material and a receptacle 150 of another material.

Referring generally to FIGS. 1-6, handles 101 in first position may be coplanar with side panels 105. When handles 101 are in first position, there are no gaps. Gaps 112 are created when handles 101 are pivoted out from their respective side panels 105. Handles 101 may be cut or perforated along the sides to make handles 101 movable or movable with minimal force applied. Moving handle 101 from first position to second position, handle 101 is pivoted out from the side panel 105 about handle connection 111, gap 112 is created in the space previously occupied by handle 101. Handle 101 pivots about the handle bottom or handle connection 111 with handle top movable in an arc about handle connection 111, with handle 101 extending from the outer surface of side panel 105. Handles 101 on opposing panels 140 would, for example, move from first position to second position in opposing direction, movable in an arc about the respective side panel of each handle.

Referring generally to FIGS. 1-3, closure panels 102 are shown extending below finger holds 108. When handles 101 are in second position and the top closure 106 is placed onto and affixed to receptacle 150, closure panels 102 may extend below the finger holds 108 or may extend far enough vertically downward to be positioned between the finger holds 108 and gaps 112. Closure panels 102 act as a barrier between the finger holds 108 of handles 101 and any box contents (not shown), when handles 101 are in second handle position. Closure panels 102 may extend to the bottom of each of the handles 101, to handle connections 111, where handles 101 connect to side panels 105. Thus, portable container 100 may be lifted without the finger holds 108 being exposed to broken glass or plastics in the receptacle interior. Positioning removable top closure 106 over receptacle 150 may cover or obstruct gaps 112 and may minimize chances of injury from sharp objects within receptacle 150, when portable container 100 is carried by handles 101. The position of the handles 101 on the sides of receptacle 150 keeps the handles 101 away from the disposal opening 114 and thus handles 101 do not obstruct disposal opening 114. Handles 101 being positioned on side panels 105, allow for large disposal openings 114 and allow for large waste deposits.

Referring to FIGS. 1-6, in embodiments of the invention, handle 101 may pivot from 0 degrees to second position, which may be beyond 170 degrees relative to first position. However, for most carrying tasks with engaged top closure 106, second position may be from approximately 20 degrees to approximately 60 degrees from first position.

The expression "frictionally fastened" refers to frictional contact between surfaces or objects providing resistance to separation of surfaces or objects. In one embodiment, top closure 106 may be placed onto the top of receptacle 150 and the surface contact between interior surfaces of closure panels 102 and the exterior surface of side panels 105 frictionally fastens the two parts. The contact between interior surfaces of closure panels 102 and the exterior surface of side panels 105 provides resistance to removing top closure 106.

A plastic bag or water proof insert may be placed inside the receptacle opening for use as a liner (not shown). Since receptacle 150 is most commonly constructed from single walled corrugated board, a liner bag may be used, or the single walled corrugated board may have a waterproof material lined surface on the container interior to protect from wet or damp waste materials. An embodiment using other paper-based container materials may similarly use a liner or have a waterproof material lined surface. Top closure 106, when placed onto the receptacle 150, may aid in holding bag type liners in place, without the need for additional fasteners or adhesives. Where portions of the bag liner extend out of top opening 408 of receptacle 150 and over side panels 105, engagement of top closure 106, may place closure panels 102 such that bag liners are held between side panels 105 and closure panels 102.

Referring to FIGS. 1-6, waste materials may be deposited through disposal opening 114 with pivotally connected flap 104. The size and shape of opening 114 may vary with the particular waste application. While these embodiments show a substantially circular pivotally connected flap 104 covering a substantially circular disposal opening 114, pivotally connected flap 104 may be of a size and shape limited by the dimensions of the lid panel 103. Other embodiments may have a pivotally connected flap 104 that is of a different size and shape than the disposal opening 114. However, pivotally connected flap 104 is more likely to be of a size and shape to match disposal opening 114. In this embodiment, disposal opening 114 and pivotally connected flap 104 are facing the front of portable container 100. Disposal opening 114 and pivotally connected flap 104 may face in any direction or orientation and may be changed by removing and engaging or replacing top closure 106, onto receptacle 150, in a different orientation. It is also possible to have embodiments with no opening or an opening with no pivotally connected flap. However, in situations where portable container 100 is used to store glass and sharp materials or objects, it is desirable to have flap 104 at least partially covering disposal opening 114, because objects may stick out. Flap 104 also serves as a convenient place to print warnings, information, and advertising.

Further referring to FIGS. 1-6, the handles 101 being pivotally connected to each of the pair of opposing side panels 140, may distribute the weight of the box between the pair of opposing side panels 140, and may help provide stability when lifting. The presence of the top closure 106 affixed to the top of the receptacle 150 may provide support at the top portion of side panels 105, limiting bowing, bending, or other box deformation and providing reinforcement to receptacle 150.

Embodiments of portable container 100 may be of any size or shape, with a square shaped base or bottom closure 208 being preferred. The height of the receptacle 150 may vary but having square base or bottom closure 208 provides easier horizontal and vertical stacking and may make for easier transportation. Handles 101, whether in first or second position, generally do not affect vertical stacking. Horizontal stacking may be largely unaffected or minimally affected because handles 101 are commonly from paperboard, making them generally foldable and flexible. However, top closure 106 may be lifted off receptacle 150, handles 101 placed in first position, and top closure 106 replaced if required.

A preferred embodiment with a top center position for handles 101 provides for a strong hand hold and greater ability to support the weight of the waste materials and the box. Such a handle may be horizontally centered with respect to the width of side panel 105 (e.g. the distance between the two sides of side panel 105) and with respect to adjacent side panels 105. Finger holds 108 may be generally, correspondingly centered with handles 101. Handles 101 on opposing side panels 140 may be generally positioned opposite each other and have substantially the same sizing within the integral boundaries of receptacle 150. To most easily have closure panel 102 between finger holds 108 and gap 112 to the inside of receptacle 150, it may be preferred to place handles 101 extending from the top or near the top of panels 105. The top of handle 101 may be, for example, collinear with the top of side panel 105. The further vertically down the side panel 105 towards the bottom closure 208 the handle connections 111 may be, the larger gaps 112 may be, and the longer closure panels 102 may be to continue to protect the finger holds 108 from gaps 112 and the waste material inside the receptacle 150. For example, handles 101 with tops collinear with tops of side panel 105, may have gaps 112 extending from the top of side panel 105 to handle connection 111, with gaps 112 having a similar width and height as handle 101. Material considerations may also factor into handles position placement as sizing of top closure 106 may be affected. In other embodiments factors such as receptacle width and height, finger hold size, the type of paper material used, and the type of waste material may be considerations for sizing and handle placement.

One preferred embodiment of a portable container 100 may have dimensions of 12.25"×12.25"×27.25" H for receptacle 150 with top closure 106 affixed on top. For such preferred embodiment, handles 101 each may measure 6.125" W×4.5" H with finger holds 108 each measuring 3" W×1.25" H. The top closure dimensions for such a portable container 100 may be 12.5" L×13.125" W×4.125" H.

In other embodiments, the handles may be the width of the side panel (e.g. for a receptacle with dimensions 12.25"×12.25"×27.25" H, the handles may be 12.25" W). However, for receptacle integrity under load it is preferable to have at least a 1" border of side panel 105 to the sides of handles 101, with the 1" border connected to each adjacent perpendicular side panel 105. For smaller receptacles, handles 101 may have a width of 4" W. A common range for the width of handles 101 may be 5"-9" W. Handles 101 may be longer or shorter than 4.5" H and it is possible to have handles 101 hinged near or at the bottom of side panels 105, where side panels 105 connect to the bottom closure 208, and extending vertically to the top of receptacle 150. A common height range for handles 101 may be 3"-7". Longer handles 101 may either require top closure 106 to have significantly longer closure panels 102, or may leave significant gaps 112. Shorter handles 101 may provide insufficient finger hold space with sufficient material to support the weight of the receptacle and waste material, without adding reinforcing material. The size of portable container 100, the size of side panels 105, and the weight of waste material portable container 100 is intended to support may factor into handle dimensions. However, for example, height ranges of 3"-7" and width ranges 5"-9" W for handles 101 may be generally applicable.

The finger holds may be die cut or perforated with some embodiments being partially die cut with folding or pivoting finger hold flaps 119. Finger hold size and position may affect the sizing of handles 101. A common range may be 2.5-5" W. It may be possible to have smaller finger holds for smaller boxes, but less than 2.5" W may likely not accommodate a grip with four fingers through finger holds 108. It may also not be likely that the finger holds will exceed 5" W without adding reinforcing material to the top of handles 101. The height of the finger holds 108 may commonly be in the range of 0.75-2" H. The height of the finger holds 108 also may affect vertical positioning within each of handles 101. Finger holds 108 are generally vertically positioned towards the top of handles 101, with the finger holds commonly positioned between 1-2" from the top of handles 101. A 3" W×1.25" H finger hold generally accommodates grasping each of handles 101 with four fingers placed through the finger hold and may be positioned on handle 101 to enable curling the thumb over the top of handles 101 to meet or to come in close proximity with the fingers. These dimensions accommodate most hand sizes. The finger hold flaps 119 provides limited reinforcement but also provides a smooth surface for finger contact. While it is possible to create a finger hold less than 1" from the top of handles 101, the portion of handles 101 above the finger holds 108 may bears significant amount of the weight of receptacle 150 when carried. With less than 1" space above the finger holds 108, it is likely to require reinforcing material. Finger holds 108 vertically positioned more than 2" from the top may make gripping difficult for most people and may inhibit placing fingers through finger holds 108 and curling the thumb over the top of the handles 101 to meet or to come in close proximity with the fingers.

In still certain other embodiments, handles 101 may maintain the preferred height, width, and finger hold ranges and still be horizontally centered but be vertically positioned away from the top of side panels 105, with the tops of handles 101 not being colinear with the top of panels 105. Handles 101 in this configuration may be below the tops of side panels 105, with handles 101 being framed within side panels 105. Such an embodiment may have side panel material above the handles 101, as well as to the sides of the handles 101. Such an embodiment may require top closure 106 to have longer closure panels 102 to cover gaps 112.

In further embodiments, handles 101 may be at other locations of the side panel 105. Handles 101 may even be offset from each other, offset from the side panel horizontal center, and the handles 101 may be at vertically different heights along the side panel 105.

The top closure dimensions for a preferred embodiment receptacle 150 may be 12.5" L×13.125" W×4.125" H. These dimensions for the top closure 106 may provide coverage of gaps 112 created when preferred embodiment handles 101 are in second position keeping the handles separated from sharp objects in the interior of receptacle 150 and top closure is engaged. In embodiments where the handles are vertically lower on the side panel, the closure panels 102 may need to be of greater vertical height to ensure coverage of gaps 112. The height of closure panels 102 may depend on, for example, the vertical height of side panels 105, the position of handles 101 on side panels 105, the size of handles 101, and the location of finger holds 108 within handles 101. In certain embodiments where handles are pivoted from the bottom of side panels 105, the height of closure panels 102 may be the same as the height of side panels 105 of receptacle 150. The length and the width of lid panel 103 will vary with the dimensions of receptacle opening 408, with width and length being correspondingly larger to ensure that top closure 106 may be frictionally fastened to the exterior of side panels 105 when engaged with receptacle 150. In certain embodiments of top closure 106, the width and length may be transposed. Protective panel 207 may generally be sized to the same or smaller than the dimensions of lid panel 103. Top closure 106 sizing may be, for example, relative to receptacle 150 sizing, relative to the size of handles 105, and relative to the location of handles 105, so as to cover receptacle opening 408 and to provide coverage of gaps 112.

"Engaging", "affixing", "operatively configuring", "covering", and similar terms implying putting a top, cover, or lid onto a receptacle, may be used interchangeably. Affixing top closure 106 to the top of enclosure 150 such that the inner sides of closure panels 102 are in frictional contact with side panels 105, so that the inner side of lid panel 103 is in contact with or in near proximity with the tops of side panels 105. By placing handles 102 in second position, affixing may also include placing top closure such that closure panels 102 are positioned below the finger holds 108, preferably covering gaps 112.

When not in use, protective panel 207 will ordinarily extend downward from one of the lid panels. If more than one protective panel is part of the embodiment, each protective panel pivotally connects to a single panel. Protective panel 207 may not be necessary for all embodiments of top closure 106. However, safety regulations and policies in academic institutions and laboratory environments often require that the top opening be securely closed when not in use or when being moved. Protective panel 207 folds up from the bottom and may make lid panel 103 a substantially solid closed surface.

A portable container, cover, and handles of the preferred dimensions may be rated for approximately 25 lbs of waste material. However, the waste weight rating will vary with the portable container dimensions and the material used to construct the portable container. The weight rating may be from 1 lbs to 100 lbs but will most commonly be used for waster material weighing within the range of 15 lbs-55 lbs.

In still other embodiments, receptacle dimensions, top closure dimensions, and handle dimensions will vary with the portable container application.

It is most common that side panels 105 are of the same height. However, there may be embodiments where a pair of opposing panels are of a different height, with an adjacent opposing side pair having a sloping geometry and configuration to match the height difference. Handles for such a configuration may have a sloped top, but it is most likely that the pivoting handle bottoms would remain parallel to the ground. Similarly, a suitable sloping top closure for such a configuration may be used.

As handles 101 are pivotally connected and extend from side panels 105, it is preferable that the handles be of the same material as the receptacle 150. It is also common that top closure 106 may be of the same or similar material as the receptacle 150. Top closure 106 may be of a different material. However, since disposability is desired, the materials used for the receptacle 150 and top closure 106 are likely to be materials that are the same or similar and have the same or similar disposal methods.

Figure 7:
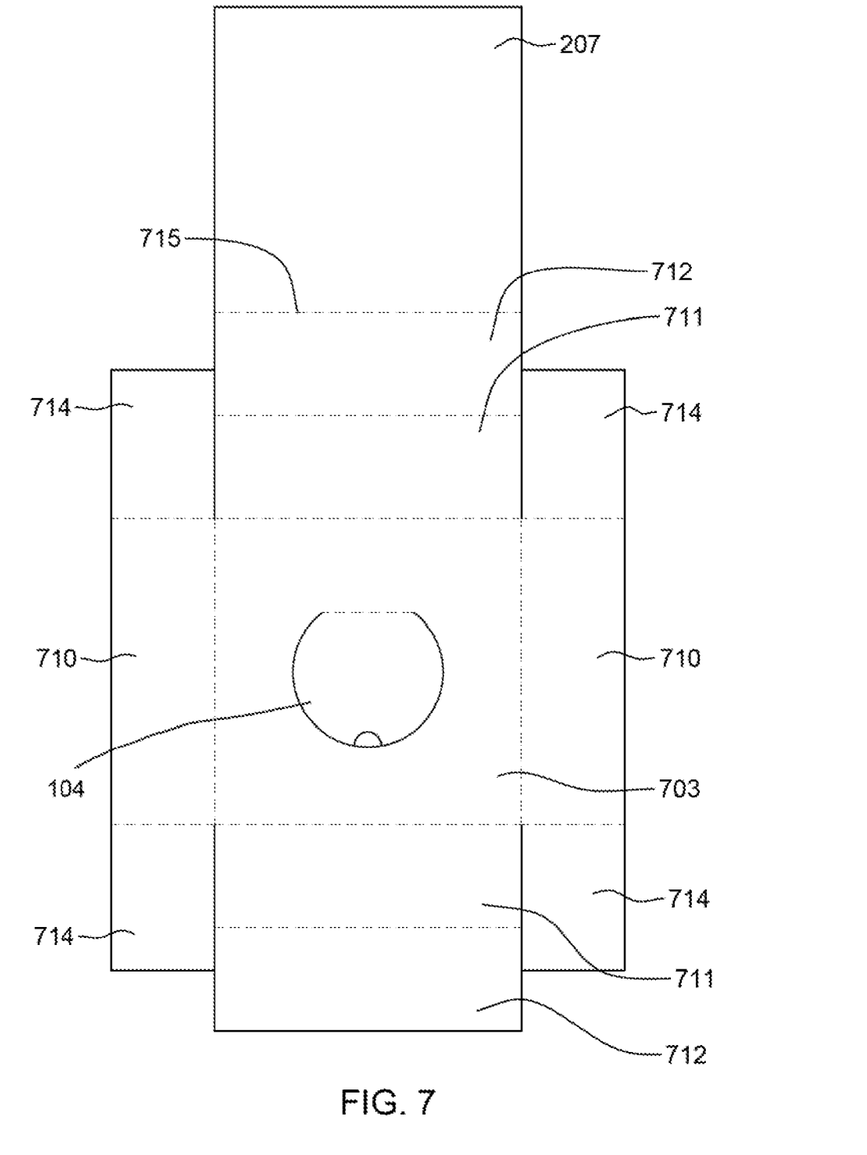
FIG. 7 is an embodiment of an unassembled top closure.

FIG. 7 depicts an embodiment of an unassembled top closure. Depicted is a top closure assembly having a pair of opposing closure panels 710. Each of a first pair of opposing closure panels 710 has a pair of side flaps 714 extending out from each side panel 710. Each of a second pair of opposing closure panels 711 has a roll-end from a pair of roll-ends 712. The first pair of closure panels 710 may be folded perpendicular to lid panel 703 (as seen from the bottom side), with side flaps 714 folded inward and perpendicular to lid panel 703, so that when second pair of closure panels 711 are folded perpendicular to lid panel 703, roll-ends 712 fold over side flaps 714. One of the second pair of opposing closure panels 711 is depicted with protective panel 207, pivotally connected, by a fold 715, to an end of one roll-end of the top closure 106. Pivotally connected flap 104 is also depicted, centrally located in lid panel 703.

Figure 8:
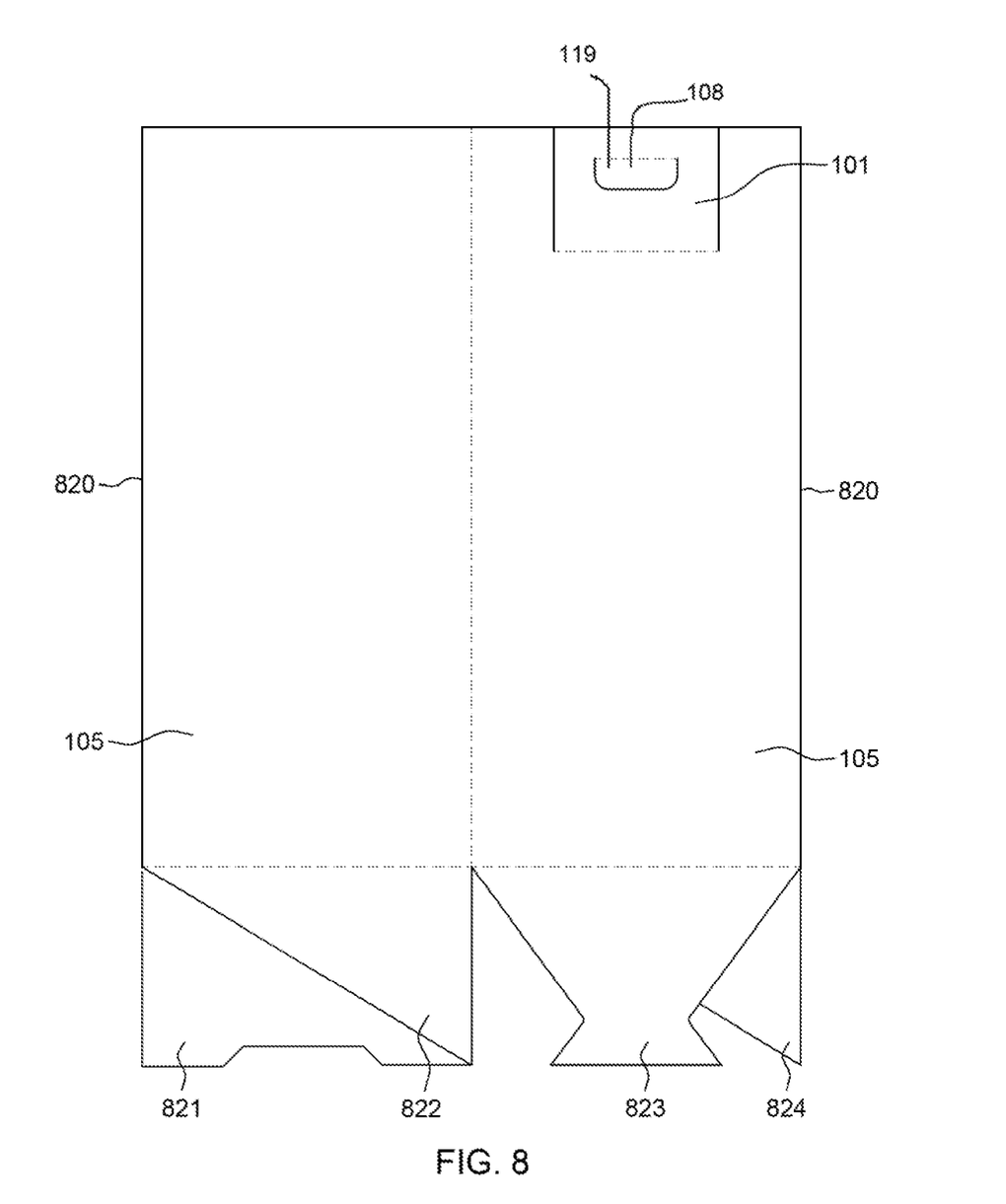
FIG. 8 is an embodiment of a partially assembled receptacle.

FIG. 8 depicts a partially assembled embodiment of receptacle 150 for shipping or prior to final assembly. Receptacle 150 and top closure 106 may be shipped flat and may be assembled. Handles 101, including finger holes 108, may be die cut or perforated but will ordinarily be in first handle position. Finger hold flaps 119 may initially be substantially flush with the surfaces of handles 101, with finger holds 108 created by pushing or folding the finger hold flaps 119. In some embodiments, the finger holds 108 may be die cut or perforated around the perimeter with the finger hold flap 119 being pushed out completely, rather than folding. Once the receptacle 150 and the top closure 106 are assembled, they may be put together and used. The handles 101 may remain in a first handle position or be moved to a second handle position before portable container 100 is used for waste disposal.

Referring to FIGS. 3, 6, and 8. One embodiment of the receptacle 150, flattened for shipping, may have a pair of opposing side panels with handles cut out and a pair of opposing side panels with no handles, with each side panel connected to a component for a lock bottom, bottom closure. There may be a plurality of bottom closure panels forming bottom closure 208.

FIG. 8 depicts four lock bottom closure panels or connections, including first bottom closure panel 821, second bottom closure panel 822, third bottom closure panel 823, and fourth bottom closure panel 824. A first side panel has a short flap 610 which is glued to the inner face of a fourth side panel, to connect the sides so as to form a box upon assembly of receptacle 150 (see FIG. 6). Receptacle 150 may be assembled by pushing in the flattened edges of the side panels 820 towards each other and then connecting the lock bottom components to create a box or container with an opening.

In embodiments of the invention, there may be more than two handles. The embodiment of FIGS. 7-8 facilitates two handles as the box and lid can be attached in any direction. Additional handles may be present in some embodiments but are not necessary. In certain embodiments, it may be desirable to have handles on each side panel 105. There may also be embodiments with one set of handles 101 on the first set of opposing side panels being differently sized from a second set of handles on the second set of opposing side panels.

There may also be embodiments where there are handles on each side panel of receptacle 150.

In common use portable container 100 is shipped as a blank or partially assembled such that the blank or partial assembly becomes the invention described herein.

Referring generally to FIGS. 1-6, receptacle 150 may be assembled, with handles 101 either in first position or in second position. However, for safety reasons, handles 101 may be placed in second position. A liner bag may be placed within receptacle 150 and may have the bag opening extending outside the receptacle. Closure 106 may be assembled, with protective panel 207 unengaged and in a generally perpendicular position to lid panel 103. Top closure 106 may be affixed to receptacle 150. If handles 101 are in second handle position, top closure 106 may be positioned so that closure panels 102 are positioned parallel to but outside of side panels 105 but between handles 101 and gaps 112. With finger holds 108 positioned within handles 101, closure panels 102 may also be between finger holds 108 and gaps 112. If handles 101 are in first handle position, top closure 106 may be engaged so that closure panels 102 are parallel to the outer surface of side panels 105 and outside of handles 101. Protective panel 207 may be on any side but will generally be on a side panel 105 of receptacle 150 having no handles. Flap 104 may generally be left in an open position, so that waste material may be deposited into disposal opening 114.

When portable container 100 is ready for disposal, top closure 106 may be removed and protective panel 207 placed against the underside of lid panel 103. If handles 101 are not already in second position, handles 101 may be pivoted away from side panels 105. Top closure 106 may be engaged so that closure panels 102 are positioned parallel to, but outside of, side panels 105 and between handles 101 and gaps 112 in side panels 105. The portable container 100 may then be transported by grasping handles 101 through finger holds 108, and lifting to move or transport portable container 100. Once portable container 100 is ready for disposal, the entire container and its contents may be disposed (e.g. incinerated), without removing the contents from the container.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

Embodiments

Embodiment 1 is a portable container for waste products, having an assembled receptacle with four side panels, hingedly connected, having bottom edges, hingedly connected, to a plurality of bottom closure panels, the bottom closure panels overlapping to form a bottom closure. The four side panels each have a top edge, such that the four side panels and the bottom closure define a box with a top opening. The four side panels include a first and a second set of opposing side panels, the first set of opposing side panels having a first side panel and a second side panel. The first side panel has a first handle, the first handle having a first handle first position and a first handle second position, such that the first handle first position is coplanar with the first side panel. The first handle further has a first handle top, a first finger hold, and a first handle bottom, the first handle bottom being parallel to a first panel bottom edge and pivotally secured to the first side panel, with the first handle being pivotally movable in an arc extending from the first side panel about the first handle bottom to a first handle second position, angled away relative to the first side panel, and defining a first gap coplanar with the first side panel. The second side panel has a second handle, having a second handle first position and a second handle second position, such that the second handle first position is coplanar with the second side panel. The second handle further has a second handle top, a second finger hold, and a second handle bottom, the second handle bottom being parallel to a second panel bottom edge and pivotally secured to the second side panel, with the second handle being pivotally movable in an arc extending from the second side panel about the second handle bottom to a second handle second position, angled away relative to the second side panel, and defining a second gap coplanar with the second side panel. The first handle and the second handle are opposably movable relative to each other. Further included is a removable top closure having a lid panel and four closure panels configured substantially perpendicular to the lid panel to define a box lid, wherein the lid panel has a top side and a bottom side.

Embodiment 2 is the portable container for waste products of embodiment 1, where the first handle being in the first handle second position, the second handle being in the second handle second position, the removable top closure positionally disposed to cover the receptacle, such that the four closure panels overlap the four side panels, such that a first closure panel is operatively configured between the first finger hold and the first gap and a second closure panel is operative configured between the second finger hold and the second gap of the receptacle.

Embodiment 3 is the portable container for waste products of embodiment 2, where the first finger hold is configured between the first handle top and the first handle bottom and the second finger hold is configured between the second handle top and the second handle bottom.

Embodiment 4 is the portable container for waste products of embodiment 1, where the first handle being in the first handle first position, the first handle top is colinear with a first side panel top and the first handle is horizontally centered and perpendicular to the first side panel top; and wherein the second handle being in the second handle first position the second handle top is colinear with a second side panel top and the second handle is horizontally centered and perpendicular to the second side panel top.

Embodiment 5 is the portable container for waste products of embodiment 1, further including a paper-based container material.

Embodiment 6 is the portable container for waste products of embodiment 5, where the paper-based container material comprises a single walled corrugated board.

Embodiment 7 is the portable container for waste products of embodiment 1 where the first handle, the second handle, the first finger hold, and the second finger hold comprise die cut openings in each of the first set of opposing side panels.

Embodiment 8 is the portable container for waste products of embodiment 1, where the bottom closure and the four side panels define a substantially square bottom closure perimeter.

Embodiment 9 is the portable container for waste products of embodiment 1, where the top closure includes a disposal opening with a pivotally connected flap.

Embodiment 10 is the portable container for waste products of embodiment 9, where at least one of the four closure panels has a pivotally connected protective panel configured to cover the disposal opening when placed against the bottom side of the lid panel.

Embodiment 11 is the portable container for waste products of embodiment 1, having a receptacle liner wherein the receptacle liner is at least partially within the receptacle.

Embodiment 12 is the portable container for waste products of embodiment 2, where the top closure is frictionally fastened.

Embodiment 13 is the portable container for waste products of embodiment 1 where the second set of opposing side panels comprising a third side panel with a third handle and a fourth side panel with a fourth handle.

Embodiment 14 is a method for safely disposing waste products, including providing a receptacle having a bottom closure, and four side panels, defining a box with a top opening, where the four side panels include a first and a second set of opposing side panels, the first set of opposing side panels having a first side panel and a second side panel. The first side panel includes a first handle, the first handle having a first handle first position and a first handle second position, such that the first handle first position is coplanar with the first side panel. The first handle further has a first handle top, a first finger hold, and a first handle bottom, the first handle bottom being parallel to a first panel bottom edge and pivotally secured to the first side panel, with the first handle being pivotally movable in an arc extending from the first side panel about the first handle bottom to a first handle second position, angled away relative to the first side panel, and defining a first gap coplanar with the first side panel. The second side panel includes a second handle, the second handle having a second handle first position and a second handle second position, such that the second handle first position is coplanar with the second side panel. The second handle further has a second handle top, a second finger hold, and a second handle bottom, the second handle bottom being parallel to a first panel bottom edge and pivotally secured to the second side panel, with the second handle being pivotally movable in an arc extending from the second side panel about the second handle bottom to a second handle second position, angled away relative to the second side panel, and defining a second gap coplanar with the second side panel. The first handle and the second handle are opposably movable relative to each other. The receptacle contains waste products. The first handle is placed in first handle second position and the second handle is placed into second handle second position. A removable top closure having a top side and a bottom side, a lid panel, and four closure panels defining a box lid, the four closure panels being substantially perpendicular to the lid panel, is placed on the receptacle. The step of placing the removable top closure on the receptacle includes the four closure panels overlapping the four side panels, such that a first closure panel is operatively configured between the first finger hold and the first gap and a second closure panel is operatively configured between the second finger hold and the second gap of the receptacle. The receptacle and top closure form a portable container.

Embodiment 15 is the method for disposing of waste products of embodiment 14, further including the step of moving the portable container, wherein the step of moving comprises grasping the first handle and the second handle, and lifting the receptacle.

Embodiment 16 is the method for disposing of waste products of embodiment 15 further comprising the steps of, loading the portable container onto a carrying device, unloading the portable container off of the carrying device, or a combination thereof.

Embodiment 17 is the method for disposing of waste products of embodiment 16, wherein the portable container is disposed.

Embodiment 18 is any one of embodiments 1-17 combined with any one or more embodiments 2-17.

What is claimed is:
1. A portable container for waste products, comprising:
an assembled receptacle comprising four side panels hingedly connected, the four side panels having bottom edges hingedly connected to a plurality of bottom closure panels, the bottom closure panels overlapping to form a bottom closure, the four side panels each having a top edge defining a top of the receptacle, such that the four side panels and the bottom closure define a box with a top opening defined by the top edges of the side panels at the top of the receptacle; and
a removable top closure configured to be seated on the top of the receptacle comprising a lid panel and four closure panels configured substantially perpendicular to the lid panel to define a box lid, wherein the lid panel has a top side and a bottom side, wherein the four side panels comprise a first and a second set of opposing side panels, the first set of opposing side panels comprising a first side panel and a second side panel, wherein the first side panel comprises a first handle, the first handle having a first handle first position and a first handle second position, such that the first handle first position is coplanar with the first side panel, wherein the first handle comprises a first handle top, a first finger hold, and a first handle bottom, the first handle being formed by a pair of separations extending downwardly from the top edge of the first side panel to the first handle bottom, the first handle bottom being parallel to a first panel bottom edge and pivotally secured to the first side panel, with the first handle being pivotally movable in an arc extending from the first side panel about the first handle bottom to a first handle second position, angled away relative to the first side panel, and defining a first gap with the first side panel, wherein the second side panel comprises a second handle, the second handle having a second handle first position and a second handle second position, such that the second handle first position is coplanar with the second side panel, wherein the second handle comprises a second handle top, a second finger hold, and a second handle bottom, the second handle being formed by a pair of separations extending downwardly from the top edge of the second side panel to the second handle bottom, the second handle bottom being parallel to a second panel bottom edge and pivotally secured to the second side panel, with the second handle being pivotally movable in an arc extending from the second side panel about the second handle bottom to a second handle second position, angled away relative to the second side panel, and defining a second gap with the second side panel, and wherein the first handle and the second handle are opposably movable relative to each other, wherein, when the top closure is seated on the top of the receptacle, a first closure panel of the four closure panels of the lid extends over the first side panel, and a second closure panel of the four closure panels of the lid extends over the second side panel, and wherein, when the top closure is seated on the top of the receptacle, a top edge of the first finger hold is positioned above a bottom edge of the first closure panel, and a top edge of the second finger hold is positioned above a bottom edge of the second closure panel.

2. The portable container for waste products of claim 1, wherein, when the top closure is seated on the top of the receptacle and the first handle is in the first handle second position, and the second handle is in the second handle second position, the first closure panel is positioned in the first gap and the second closure panel is positioned in the second gap.

3. The portable container for waste products of claim 1, wherein the first finger hold is configured between the first handle top and the first handle bottom, and the second finger hold is configured between the second handle top and the second handle bottom.

4. The portable container for waste products of claim 1, wherein the assembled receptacle and the removable top closure are formed of a paper-based container material.

5. The portable container for waste products of claim 4, wherein the paper-based container material comprises a single walled corrugated board.

6. The portable container for waste products of claim 1, wherein the pairs of separations, the first finger hold, and the second finger hold comprise die cut openings.

7. The portable container for waste products of claim 1, further comprising a receptacle liner positioned at least partially within the box.

8. The portable container for waste products of claim 1, wherein the second set of opposing side panels comprises a third side panel with a third handle comprising a third finger hold and a fourth side panel with a fourth handle comprising a fourth finger hold, and wherein, when the top closure is seated on the top of the receptacle, a third closure panel of the four closure panels of the lid extends over the third side panel, and a fourth closure panel of the four closure panels of the lid extends over the fourth, a top edge of the third finger hold is positioned above a bottom edge of the third closure panel, and a top edge of the fourth finger hold is positioned above a bottom edge of the fourth closure panel.

9. The portable container for waste products of claim 1, wherein the first handle top of the first handle comprises a portion of the top edge of the first side panel, and the second handle top of the second handle comprises a portion of the top edge of the second side panel.

10. The portable container for waste products of claim 1, wherein, when in the first handle first position, the first handle top of the first handle is colinear with the top edge of the first side panel at the top of the receptacle, and when, in the second handle first position, the second handle top of the second handle is colinear with the top edge of the second side panel at the top of the receptacle, and wherein the top of the receptacle comprises the uppermost extent of the receptacle.

11. The portable container for waste products of claim 1, wherein, when the top closure is seated on the top of the receptacle, and the first handle is in the first handle second position and the second handle is in the second handle second position, the first handle top of the first handle and the second handle top of the second handle engage and underside of the lid panel.

12. The portable container for waste products of claim 1, wherein at least one of the four closure panels has a pivotally connected protective panel configured to cover the disposal opening when placed against the bottom side of the lid panel.

13. The portable container for waste products of claim 12, wherein the removable top closure includes a disposal opening with a pivotally connected closure flap.

14. A portable container for waste products, comprising:
an assembled receptacle comprising four side panels hingedly connected, the four side panels having bottom edges hingedly connected to a plurality of bottom closure panels, the bottom closure panels overlapping to form a bottom closure, the four side panels each having a top edge, such that the four side panels and the bottom closure define a box with a top opening; and
a removable top closure configured to be seated on the top of the receptacle comprising a lid panel and four closure panels configured substantially perpendicular to the lid panel to define a box lid, wherein the lid panel has a top side and a bottom side,
wherein the four side panels comprise a first and a second set of opposing side panels, the first set of opposing side panels comprising a first side panel and a second side panel,
wherein the first side panel comprises a first handle, the first handle having a first handle first position and a first handle second position, such that the first handle first position is coplanar with the first side panel, wherein the first handle comprises a first handle top, a first finger hold, and a first handle bottom, the first handle bottom being parallel to a first panel bottom edge and pivotally secured to the first side panel, with the first handle being pivotally movable in an arc extending from the first side panel about the first handle bottom to a first handle second position, angled away relative to the first side panel, and defining a first gap coplanar with the first side panel, wherein the second side panel comprises a second handle, the second handle having a second handle first position and a second handle second position, such that the second handle first position is coplanar with the second side panel, wherein the second handle comprises a second handle top, a second finger hold, and a second handle bottom, the second handle bottom being parallel to a second panel bottom edge and pivotally secured to the second side panel, with the second handle being pivotally movable in an arc extending from the second side panel about the second handle bottom to a second handle second position, angled away relative to the second side panel, and defining a second gap coplanar with the second side panel, wherein the first handle and the second handle are opposably movable relative to each other, wherein the top closure includes a disposal opening with a pivotally connected flap, and wherein at least one of the four closure panels has a pivotally connected protective panel configured to cover the disposal opening when placed against the bottom side of the lid panel.

15. A method for safely disposing waste products, comprising:

providing a receptacle having a bottom closure, and four side panels, defining a box with a top opening, the four side panels each having a top edge defining a top of the receptacle such that the four side panels define the top opening at the top of the receptacle, wherein the four side panels comprise a first and a second set of opposing side panels, the first set of opposing side panels comprising a first side panel and a second side panel, wherein the first side panel comprises a first handle, the first handle having a first handle first position and a first handle second position, such that the first handle first position is coplanar with the first side panel, wherein the first handle comprises a first handle top, a first finger hold, and a first handle bottom, the first handle being formed by a pair of separations extending downwardly from the top edge of the first side panel to the first handle bottom, the first handle bottom being parallel to a first panel bottom edge and pivotally secured to the first side panel, with the first handle being pivotally movable in an arc extending from the first side panel about the first handle bottom to a first handle second position, angled away relative to the first side panel, and defining a first gap coplanar with the first side panel, wherein the second side panel comprises a second handle, the second handle having a second handle first position and a second handle second position, such that the second handle first position is coplanar with the second side panel, wherein the second handle comprises a second handle top, a second finger hold, and a second handle bottom, the second handle being formed by a pair of separations extending downwardly from the top edge of the second side panel to the second handle bottom, the second handle bottom being parallel to a second panel bottom edge and pivotally secured to the second side panel, with the second handle being pivotally movable in an arc extending from the second side panel about the second handle bottom to a second handle second position, angled away relative to the second side panel, and defining a second gap coplanar with the second side panel, wherein the first handle and the second handle are opposably movable relative to each other, and wherein said receptacle contains waste products;

placing the first handle in the first handle second position and placing the second handle in the second handle second position; and placing a removable top closure on the receptacle to form a portable container, wherein the removable top closure comprises a lid panel and four closure panels defining a box lid; the lid panel having a top side and a bottom side; the four closure panels being substantially perpendicular to the lid panel, wherein placing the removable top closure on the receptacle comprises the overlapping the four side panels with the four closure panels such that a first closure panel is operatively configured between the first finger hold and the first gap and a top edge of the first finger hold is positioned above a bottom edge of the first closure panel, and a second closure panel is operative configured between the second finger hold and the second gap of the receptacle and a top edge of the second finger hold is positioned above a bottom edge of the second closure panel.

16. The method for safely disposing waste products of claim 15, further comprising moving the portable container via grasping the first handle and the second handle and lifting the receptacle.

17. The method for safely disposing waste products of claim 15, further comprising disposing the portable container and the waste products therein.

18. A portable container for waste products, comprising:

an assembled receptacle comprising four side panels hingedly connected, the four side panels having bottom edges hingedly connected to a plurality of bottom closure panels, the bottom closure panels overlapping to form a bottom closure, the four side panels each having a top edge defining a top of the receptacle, such that the four side panels and the bottom closure define a box with a top opening defined by the top edges of the side panels at the top of the receptacle; and a removable top closure configured to be seated on the top of the receptacle comprising a lid panel and four closure panels configured substantially perpendicular to the lid panel to define a box lid, wherein the lid panel has a top side and a bottom side, wherein the four side panels comprise a first and a second set of opposing side panels, the first set of opposing side panels comprising a first side panel and a second side panel, wherein the first side panel comprises a first handle, the first handle having a first handle first position and a first handle second position, such that the first handle first position is coplanar with the first side panel, wherein the first handle comprises a first handle top, a first finger hold, and a first handle bottom, the first handle being formed by a pair of separations extending downwardly from the top edge of the first side panel to the first handle bottom, the first handle bottom being parallel to a first panel bottom edge and pivotally secured to the first side panel, with the first handle being pivotally movable in an arc extending from the first side panel about the first handle bottom to a first handle second position, angled away relative to the first side panel, and defining a first gap with the first side panel, wherein the second side panel comprises a second handle, the second handle having a second handle first position and a second handle second position, such that the second handle first position is coplanar with the second side panel, wherein the second handle comprises a second handle top, a second finger hold, and a second handle bottom, the second handle being formed by a pair of separations extending downwardly from the top edge of the second side panel to the second handle bottom, the second handle bottom being parallel to a second panel bottom edge and pivotally secured to the second side panel, with the second handle being pivotally movable in an arc extending from the second side panel about the second handle bottom to a second handle second position, angled away relative to the second side panel, and defining a second gap with the second side panel, and wherein the first handle and the second handle are opposably movable relative to each other, and are positioned at the uppermost extent of the first and second side panels, respectively, at the uppermost extent of the assembled receptacle.

19. The portable container of claim 18, wherein, when the top closure is seated on the top of the receptacle, each of the first and second finger holds at least partially overlaps with a respective closure panel of the four closure panels of the top closure.

20. The portable container of claim 18, wherein, when the top closure is seated on the top of the receptacle, and the first handle is in the first handle second position and the second handle is in the second handle second position, the first handle top of the first handle and the second handle top of the second handle engage and underside of the lid panel.

21. The portable container of claim 18, wherein at least one of the four closure panels has a pivotally connected protective panel configured to cover the disposal opening when placed against the bottom side of the lid panel.

* * * * *